US012681426B2

(12) United States Patent (10) Patent No.: US 12,681,426 B2
Sato (45) Date of Patent: Jul. 14, 2026

(54) IMAGE FORMING APPARATUS AND PAPER DUST CLEANING DEVICE

(71) Applicant: KYOCERA Document Solutions Inc., Osaka (JP)

(72) Inventor: Takehiro Sato, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 280 days.

(21) Appl. No.: 18/600,335

(22) Filed: Mar. 8, 2024

(65) Prior Publication Data

US 2024/0305730 A1 Sep. 12, 2024

(30) Foreign Application Priority Data

Mar. 9, 2023 (JP) ................................. 2023-036430

(51) Int. Cl.
*G03G 21/00* (2006.01)
*G03G 21/16* (2006.01)
*H04N 1/00* (2006.01)

(52) U.S. Cl.
CPC ........... *G03G 21/169* (2013.01); *G03G 21/00* (2013.01); *H04N 1/00909* (2013.01); *G03G 2215/00531* (2013.01); *G03G 2215/00708* (2013.01); *G03G 2221/0042* (2013.01); *G03G 2221/0068* (2013.01); *H04N 2201/0422* (2013.01)

(58) Field of Classification Search
CPC .. G03G 15/6529; G03G 21/00; G03G 21/007; G03G 21/169; G03G 2215/00531; G03G 2215/00708; G03G 2215/1647; G03G 2221/0042; G03G 2221/0068; H04N 1/00551; H04N 1/00909; H04N 1/123; H04N 2201/0422
See application file for complete search history.

(56) References Cited

U.S. PATENT DOCUMENTS

2019/0146403 A1* 5/2019 Maeda ............... G03G 15/6529
399/357

FOREIGN PATENT DOCUMENTS

JP H07210044 A * 8/1995
JP 2008287173 A 11/2008

OTHER PUBLICATIONS

Machine translation of JP 07-210044 A (Year: 1995).*

* cited by examiner

*Primary Examiner* — Sophia S Chen
(74) *Attorney, Agent, or Firm* — Alleman Hall LLP

(57) ABSTRACT

The present disclosure is an image forming apparatus including a paper dust cleaning device which removes paper dust adhered onto a surface of a conveying roller. The paper dust cleaning device includes a paper dust removing member which comes into contact with the surface of the conveying roller, a holder which holds the paper dust removing member, and a holder supporting portion which holds the holder at a predetermined attachment position so that the paper dust removing member comes into contact with the surface of the conveying roller, and the holder supporting portion includes a first guide portion which is provided on a side of the attachment position and guides the holder to a separated position at which the holder is set apart from the surface of the conveying roller in accordance with a movement of the holder from the attachment position toward a side of an insertion slot.

9 Claims, 15 Drawing Sheets

IMAGE FORMING APPARATUS AND PAPER DUST CLEANING DEVICE

INCORPORATION BY REFERENCE

This application is based upon and claims the benefit of priority from the corresponding Japanese Patent Application No. 2023-036430 filed on Mar. 9, 2023, the entire contents of which are incorporated herein by reference.

BACKGROUND

The present disclosure relates to an image forming apparatus which forms an image on a paper sheet, and a paper dust cleaning device.

An image forming apparatus such as a printer, a copying machine, a facsimile, and a multifunction peripheral having those functions has a printing function for forming an image on a printing sheet conveyed from a sheet tray by a conveying roller. When the printing sheet reaches an image forming position (image transfer position), an image is formed on that printing sheet. Further, before the printing sheet reaches the image forming position, the image forming apparatus may control operations of the conveying roller to perform a correction operation such as a printing sheet skew correction and a positional deviation correction.

Moreover, conventionally, an image forming apparatus including a paper dust removing tool which removes paper dust that has adhered onto the conveying roller has been known.

SUMMARY

An image forming apparatus according to an aspect of the present disclosure is an image forming apparatus including a paper dust cleaning device which removes paper dust that has adhered onto a surface of a conveying roller that conveys a paper sheet in a predetermined conveying direction. The paper dust cleaning device includes a paper dust removing member which extends in an axial direction of the conveying roller and comes into contact with the surface of the conveying roller, a holder which is formed in a shape that is elongated in the axial direction and holds the paper dust removing member, and a holder supporting portion which supports the holder such that the holder is movable in the axial direction and holds the holder inserted from a predetermined insertion slot along the axial direction at a predetermined attachment position so that the paper dust removing member comes into contact with the surface of the conveying roller. The holder supporting portion includes a first guide portion which is provided on a side of the attachment position and guides the holder to a separated position at which the holder is set apart from the surface of the conveying roller in accordance with a movement of the holder from the attachment position toward a side of the insertion slot.

A paper dust cleaning device according to another aspect of the present disclosure is a paper dust cleaning device which removes paper dust that has adhered onto a surface of a conveying roller that conveys a paper sheet in a predetermined conveying direction. The paper dust cleaning device includes: a paper dust removing member which extends in an axial direction of the conveying roller and comes into contact with the surface of the conveying roller; a holder which is formed in a shape that is elongated in the axial direction and holds the paper dust removing member; and a holder supporting portion which supports the holder such that the holder is movable in the axial direction and holds the holder inserted from a predetermined insertion slot along the axial direction at a predetermined attachment position so that the paper dust removing member comes into contact with the surface of the conveying roller. The holder supporting portion includes a first guide portion which is provided on a side of the attachment position and guides the holder to a separated position at which the holder is set apart from the surface of the conveying roller in accordance with a movement of the holder from the attachment position toward a side of the insertion slot.

According to the present disclosure, it is possible to prevent, when replacing the paper dust removing member, the removed paper dust from adhering onto the conveying roller from the paper dust removing member.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings as appropriate. The embodiment described below is a mere example of embodying the present disclosure and does not limit the technical scope of the present disclosure.

Figure 1:
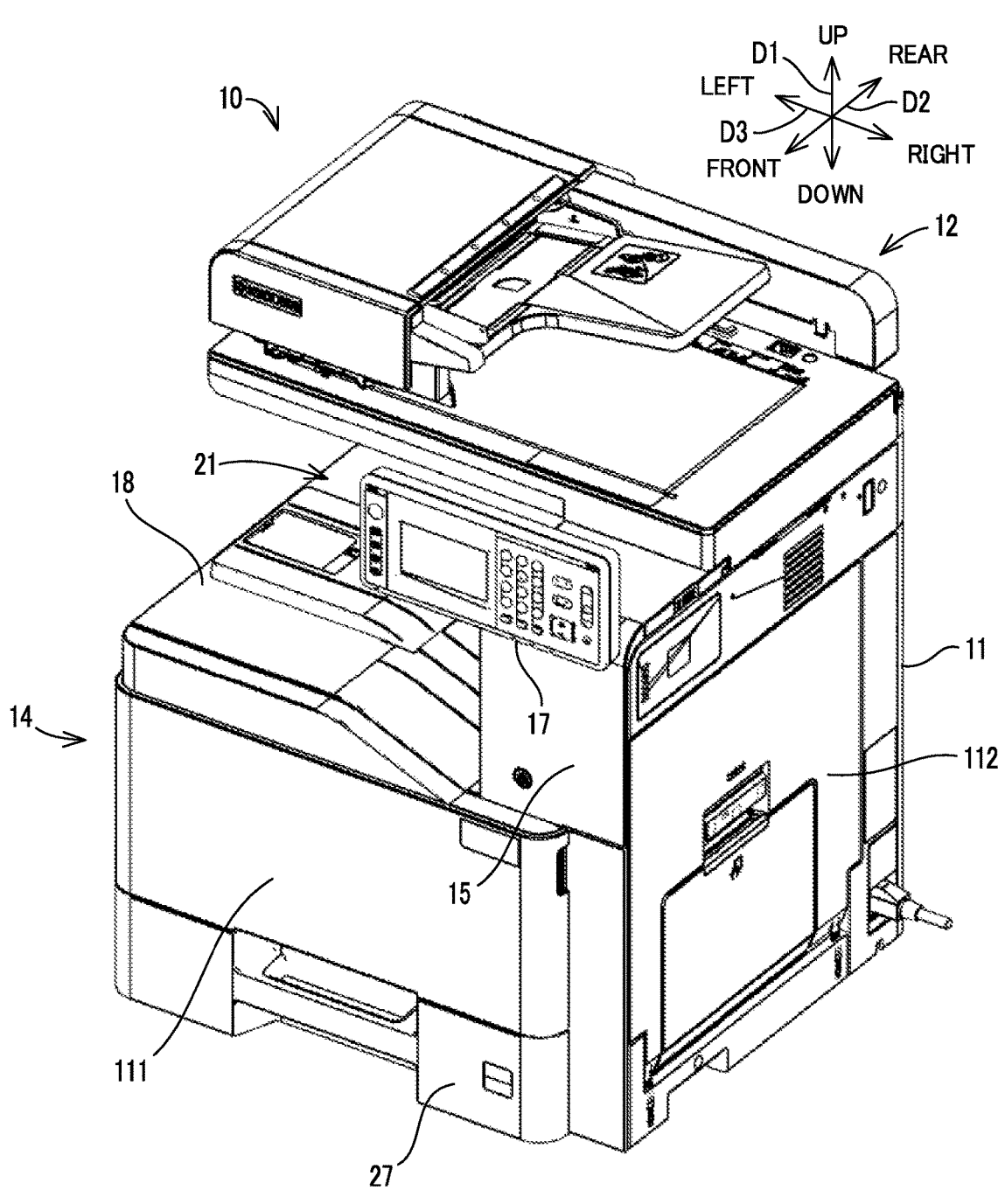
FIG. 1 is a perspective view showing a configuration of an image forming apparatus according to an embodiment of the present disclosure.
Figure 2:
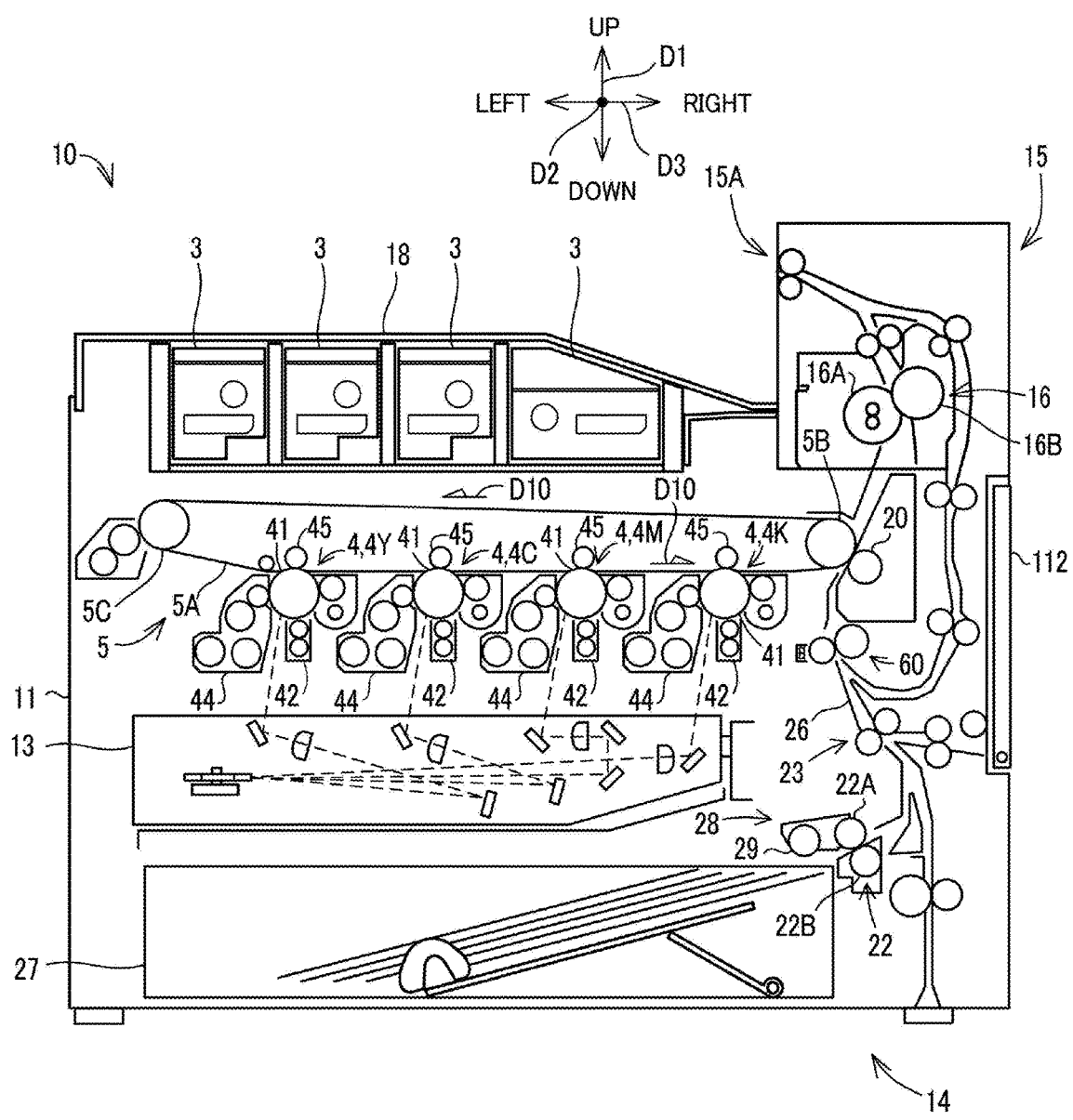
FIG. 2 is a schematic diagram showing an internal configuration of the image forming apparatus.

FIG. 1 is a perspective view showing a configuration of an image forming apparatus 10 according to the embodiment of the present disclosure. FIG. 2 is a schematic diagram showing an internal configuration of the image forming apparatus 10. In descriptions below, an up-down direction D1, a front-rear direction D2, and a left-right direction D3 are defined using a state where the image forming apparatus 10 is installed in a usable state (a state shown in FIG. 1) as a reference.

[Image Forming Apparatus 10]

As shown in FIG. 1, the image forming apparatus 10 is a multifunction peripheral capable of printing an image on a sheet such as a printing sheet and has respective functions including a printing function, a copying function, a facsimile function, a scanning function, and the like. The image forming apparatus 10 only needs to be an apparatus having a printing function for printing an image on a conveyed sheet without being limited to the multifunction peripheral, and may be, for example, a printer, a copying machine, a FAX device, or the like.

The image forming apparatus 10 includes an image reading portion 12 and an image forming portion 14. The image reading portion 12 carries out processing of reading an image of a document sheet and is provided at an upper portion of the image forming apparatus 10. The image forming portion 14 carries out processing of forming a color image based on electrophotography and is provided at a lower portion of the image forming apparatus 10. Further, a sheet discharge portion 15 is provided on a right side of the image forming portion 14.

A discharge space 21 is provided above the image forming portion 14. The sheet discharge portion 15 connects the image forming portion 14 and the image reading portion 12 in the up-down direction while forming the discharge space 21 between the image forming portion 14 and the image reading portion 12.

The sheet discharge portion 15 discharges a sheet that has been formed with an image to the discharge space 21. A sheet discharge outlet 15A (see FIG. 2) is formed on a left side surface of the sheet discharge portion 15 on the discharge space 21 side. The sheet is discharged from the sheet discharge outlet 15A.

The image forming portion 14 includes a housing 11 as an apparatus body. Respective elements constituting the image forming portion 14 are provided inside the housing 11. The housing 11 includes an exterior frame that covers the entire image forming portion 14 and an internal frame for supporting respective portions constituting the image forming portion 14.

A front cover 111 (an example of a lock member and cover member of the present disclosure) for opening the inside of the housing 11 is provided on a front surface of the housing 11. The front cover 111 is supported while being rotatable in a front direction by a supporting shaft (not shown) that is provided at a left end portion on a front surface of the housing 11 and extends in the up-down direction D1.

FIG. 2 is a schematic diagram showing the internal configuration of the image forming apparatus 10. In FIG. 2, illustration of the image reading portion 12 is omitted.

The image forming portion 14 forms a color image on a sheet such as a printing sheet based on a so-called tandem system. As shown in FIG. 2, the image forming portion 14 includes a plurality of image forming units 4, an intermediate transfer unit 5, a laser scanning unit 13, a secondary transfer roller 20, a fixing device 16, a sheet tray 18, a sheet storing portion 27, a sheet feed unit 28, an operation display portion 17 (see FIG. 1), a sheet conveying path 26 (hereinafter, will be referred to as the conveying path 26), a sheet conveying unit 23, a sheet correction unit 60, toner containers 3, a control portion 30 (see FIG. 4), and the like.

As shown in FIG. 2, the sheet storing portion 27 is provided at a lowermost portion of the image forming apparatus 10. The sheet storing portion 27 stores sheets onto which images are to be transferred by the image forming units 4 and is formed in, for example, a tray-like shape that is opened on an upper side. The sheet storing portion 27 is supported by the housing 11.

The sheet feed unit 28 takes out a plurality of sheets stacked in the sheet storing portion 27 one by one and feeds the sheet toward the conveying path 26. The sheet feed unit 28 includes a pickup roller 29 and a sheet feed roller pair 22. The pickup roller 29 and the sheet feed roller pair 22 are provided on an upper side of a right side portion of the sheet storing portion 27.

Figure 3:
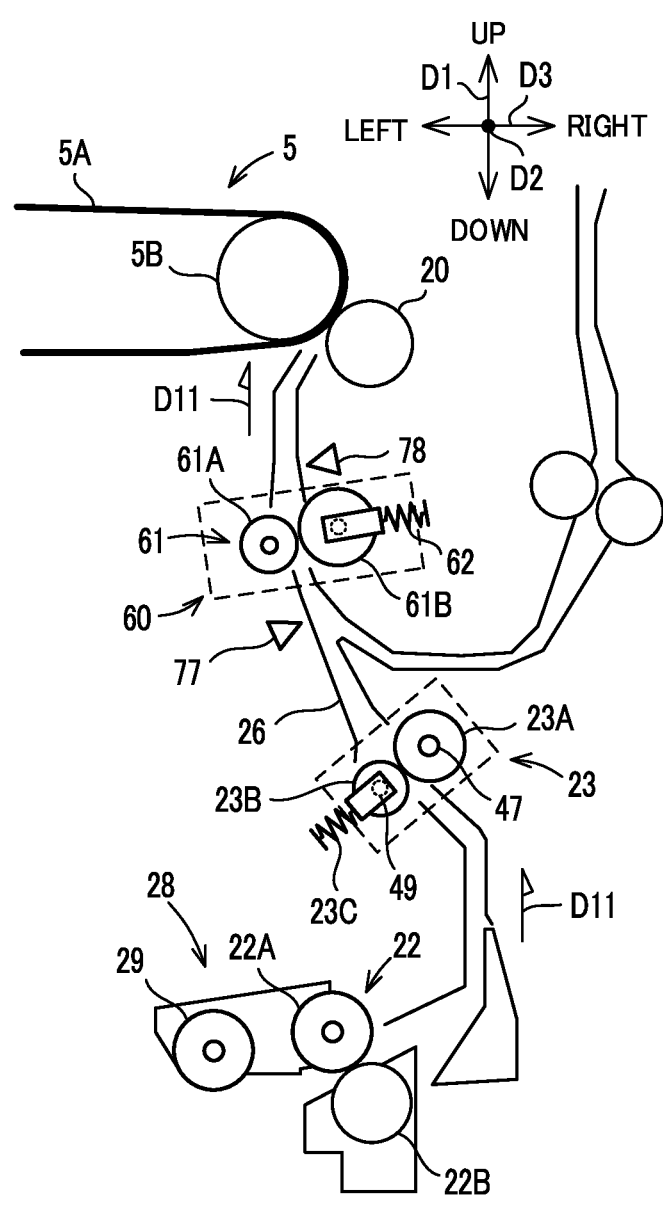
FIG. 3 is a schematic diagram showing a peripheral configuration of a sheet conveying path of the image forming apparatus.

FIG. 3 is a schematic diagram showing a peripheral configuration of the conveying path 26. Upon receiving a rotational driving force from a conveying motor 51 (see FIG. 4), the sheet feed roller pair 22 conveys a sheet toward a downstream side of a conveying direction D11. As shown in FIG. 3, the sheet feed roller pair 22 includes a drive roller 22A that rotates by the transmission of the rotational driving force from the conveying motor 51 and a driven roller 22B that comes into contact with the drive roller 22A to be driven. A drive transmission mechanism (not shown) which transmits a rotation of the drive roller 22A to the pickup roller 29 is provided between the pickup roller 29 and the drive roller 22A. The pickup roller 29 and the drive roller 22A are connected via the drive transmission mechanism. When the drive roller 22A is rotated by the conveying motor 51, the pickup roller 29 also rotates in the same direction as the drive roller 22A by the drive transmission mechanism.

When the image forming apparatus 10 is input with an instruction signal to start a sheet feed operation, the pickup roller 29 and the sheet feed roller pair 22 rotate by the rotational driving force of the conveying motor 51, and a sheet is fed from the sheet storing portion 27 to the conveying path 26.

The conveying path 26 is a guide path for guiding the sheet fed by the sheet feed roller pair 22 to the sheet discharge outlet 15A. As shown in FIG. 2, the conveying path 26 is curved upwardly from the sheet feed roller pair 22 and then extends upwardly to reach the sheet discharge outlet 15A via the secondary transfer roller 20.

As shown in FIG. 2, a side cover 112 for exposing the conveying path 26 inside the housing 11 is provided on a right side surface of the housing 11. The side cover 112 is rotatably supported by a supporting shaft (not shown) that is provided at a lower end portion of an opening on the right side surface of the housing 11 and extends in the front-rear direction D2. A conveying guide which constitutes a right-side guide surface of the conveying path 26 is provided integrally on an inner surface side of the side cover 112. Therefore, when the side cover 112 is opened, the conveying path 26 is opened.

As shown in FIG. 3, the sheet conveying unit 23 and the sheet correction unit 60 are provided in the vicinity of the conveying path 26.

By receiving a rotational driving force from the conveying motor 51 (see FIG. 4), the sheet conveying unit 23 conveys the sheet toward the downstream side of the conveying direction D11. The sheet fed to the conveying path 26 by the sheet feed unit 28 is conveyed toward the downstream side of the conveying direction D11 by the sheet conveying unit 23.

The sheet correction unit 60 is arranged more on the downstream side of the conveying direction D11 than the sheet conveying unit 23 on the conveying path 26. The sheet correction unit 60 conveys, while correcting an orientation and position of a sheet conveyed on the conveying path 26 while being tilted with respect to the conveying direction D11, the sheet toward the downstream side of the conveying direction D11. The configuration of the sheet correction unit 60 will be described later.

As shown in FIG. 2, each of the image forming units 4 is provided on a lower side of the intermediate transfer unit 5. Each of the image forming units 4 carries out image forming processing for forming a toner image on a surface of a transfer belt 5A based on image data input from outside. The respective image forming units 4 are arranged along a traveling direction of the transfer belt 5A (a direction indicated by arrows D10). An image forming unit 4Y for yellow, an image forming unit 4C for cyan, an image forming unit 4M for magenta, and an image forming unit 4K for black are arranged in line in the stated order from the left side to the right side of the transfer belt 5A.

Each of the image forming units 4 includes a photoconductor drum 41, a charging device 42, a developing device 44, a primary transfer roller 45, and the like. The image forming unit 4Y uses yellow toner to form a toner image on a surface of the photoconductor drum 41. The image forming unit 4C uses cyan toner, the image forming unit 4M uses magenta toner, and the image forming unit 4K uses black toner to respectively form toner images on the surfaces of the photoconductor drums 41. Developing processing of the toner image with respect to the photoconductor drum 41 is carried out by the developing device 44.

The intermediate transfer unit 5 includes the transfer belt 5A, a drive roller 5B, and a driven roller 50. The transfer belt 5A is an annular belt member onto which toner images of the respective colors that have been formed on the photoconductor drums 41 of the respective image forming units 4 are to be transferred. The transfer belt 5A is provided on the upper side of the photoconductor drums 41. The transfer belt 5A is rotatably supported by the drive roller 5B and the driven roller 5C that are provided apart from each other in the left-right direction D3. The transfer belt 5A is supported while being stretched across the drive roller 5B and the driven roller 5C. Toner images are sequentially transferred onto a surface of the transfer belt 5A in an overlapping manner from the respective photoconductor drums 41 when the surface of the transfer belt 5A passes through gaps between the photoconductor drums 41 and the primary transfer rollers 45.

The laser scanning unit 13 radiates laser light onto the photoconductor drums 41 of the respective image forming units 4 based on input image data of the respective colors. Thus, an electrostatic latent image is formed on each of the photoconductor drums 41.

The secondary transfer roller 20 is provided opposed to the drive roller 5B so as to sandwich the conveying path 26 extending in the up-down direction with the drive roller 5B. The secondary transfer roller 20 carries out transfer processing for transferring the toner image on the transfer belt 5A onto a surface (transfer surface) of the sheet by a transfer potential applied to the secondary transfer roller 20. The sheet onto which the toner image has been transferred is conveyed to the fixing device 16.

The fixing device 16 heats the toner image transferred onto the sheet to fix the toner image onto the sheet and includes a heating roller 16A and a pressure roller 16B. The sheet conveyed to the fixing device 16 is conveyed while being nipped by the heating roller 16A and the pressure roller 16B. During this conveyance, heat from the heating roller 16A is transmitted to the toner image transferred onto the sheet, and thus the toner image is heated. Thus, the toner image is fixed onto the surface of the sheet. After that, the sheet is discharged onto the sheet tray 18 by the sheet discharge portion 15.

[Sheet Conveying Unit 23]

As shown in FIG. 3, the sheet conveying unit 23 includes a drive roller 23A that is rotationally driven by a driving force from the conveying motor 51 (see FIG. 4) and a driven roller 23B that is arranged while being in contact with an outer circumferential surface of the drive roller 23A. The drive roller 23A and the driven roller 23B realize a conveying roller pair.

The drive roller 23A is fixed to a rotation shaft 47 extending in the front-rear direction D2 (hereinafter, may also be referred to as a width direction D2), and this rotation shaft 47 is rotatably supported by the internal frame of the housing 11. The driving force from the conveying motor 51 (see FIG. 4) is transmitted to the rotation shaft 47. The driving force of the conveying motor 51 is transmitted to the rotation shaft 47 via a transmission mechanism (not shown) such as a gear or a belt.

The driven roller 23B is biased toward the drive roller 23A side by a predetermined elastic force (spring force) of a spring 23C. A bearing portion (not shown) that axially supports a rotation shaft 49 of the driven roller 23B is biased by the spring 23C. Thus, the driven roller 23B is brought into pressure contact with the drive roller 23A. When the drive roller 23A is rotationally driven in this state, the driven roller 23B is also driven.

As shown in FIG. 3, the conveying path 26 is provided with a tip end detection sensor 77. The tip end detection sensor 77 detects a tip end of a sheet conveyed on the conveying path 26. On the conveying path 26, the tip end detection sensor 77 is provided more on the downstream side of the conveying direction D11 than the sheet conveying unit 23 and more on the upstream side of the conveying direction D11 than the sheet correction unit 60.

The tip end detection sensor 77 is, for example, a line sensor that extends in the width direction D2. The line sensor is constituted of a plurality of image sensors arranged in line along the width direction D2. The tip end detection sensor 77 is connected to the control portion 30. The tip end detection sensor 77 outputs detection signals including image data of a tip end of a sheet (concentration data) to the control portion 30. Upon acquiring the detection signals from the tip end detection sensor 77, the control portion 30 determines whether or not the sheet has reached a detection position of the tip end detection sensor 77 based on the detection signals. This determination method is well known from the past, so detailed descriptions thereof will be omitted.

It is noted that the tip end detection sensor 77 may be a reflective optical sensor provided at a center of the conveying path 26. The reflective optical sensor includes a light-emitting element and a light-receiving element, receives reflected light of light emitted from the light-emitting element, and outputs a detection signal corresponding to the received amount of light. The control portion 30 may determine whether or not the conveyed sheet has reached the detection position of the tip end detection sensor 77 based on a changing point of the detection signal transmitted from the reflective optical sensor.

As shown in FIG. 3, on the conveying path 26, an edge detection sensor 78 is provided more on the downstream side of the conveying direction D11 than the sheet correction unit 60.

The edge detection sensor 78 is arranged more on the downstream side of the conveying direction D11 than the sheet correction unit 60 and more on the upstream side than the image transfer position by the secondary transfer roller 20. The edge detection sensor 78 detects both end positions of the sheet that has passed through the sheet correction unit 60 in the width direction D2. The edge detection sensor 78 is a pair of line sensors provided at positions apart from each other at regular intervals from the center of the conveying path 26 toward the outer side in the width direction D2. Each line sensor is constituted of a plurality of image sensors arranged in line along the width direction D2. In the present embodiment, the edge detection sensor 78 is arranged such that end portions of the sheet in the width direction D2 pass through the respective line sensors.

Figure 4:
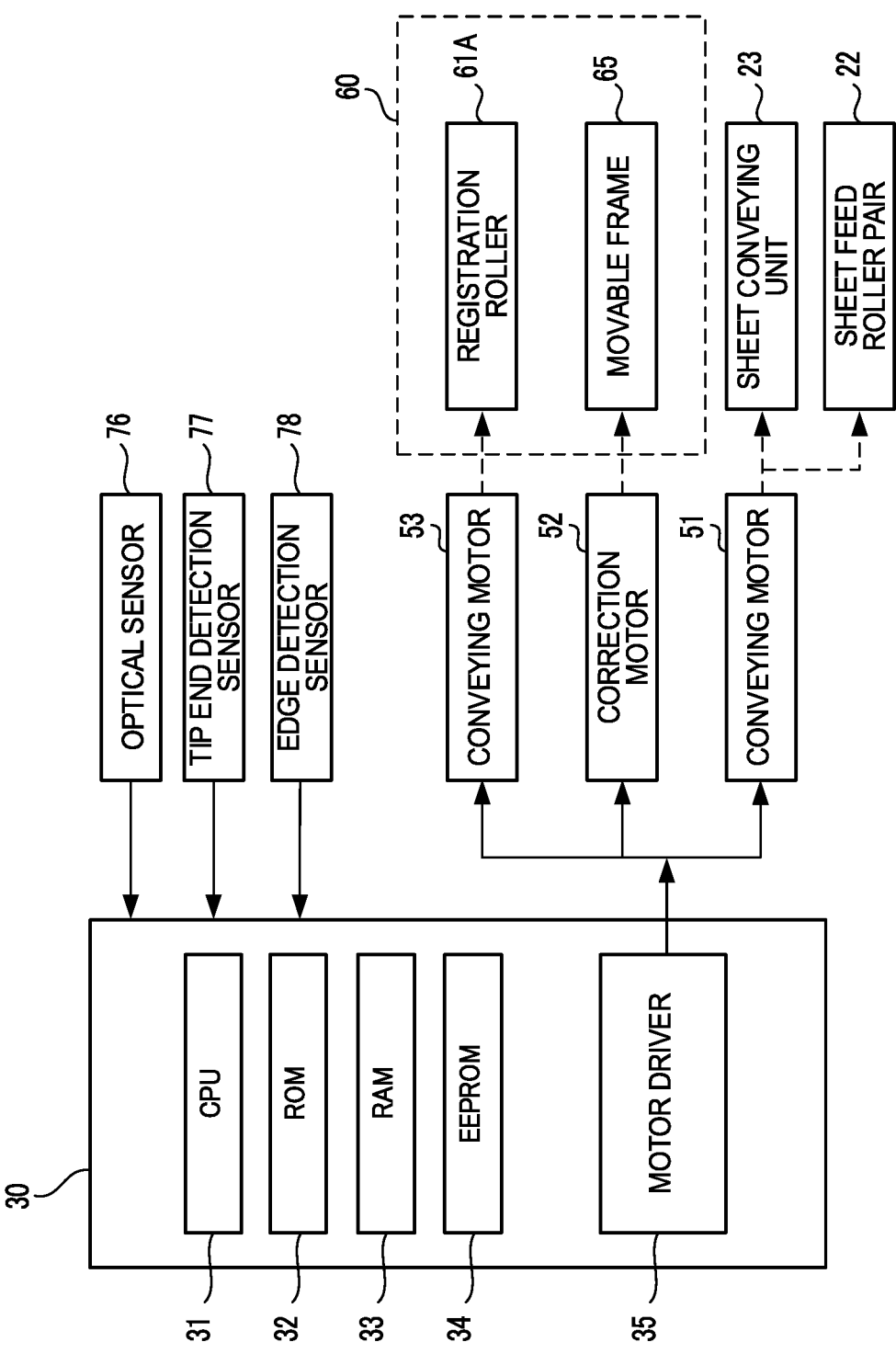
FIG. 4 is a block diagram showing a configuration of the image forming apparatus.

As shown in FIG. 4, the edge detection sensor 78 is connected to the control portion 30. The edge detection sensor 78 outputs detection signals including image data of both end portions of a sheet (concentration data) (concentration signals) to the control portion 30. Upon acquiring the detection signals from the edge detection sensor 78, the control portion 30 determines a position of the sheet in the width direction D2 based on the detection signals. Specifically, the control portion 30 determines whether or not the sheet is positioned at a center of the width direction D2, whether or not the sheet is deviated on either side in the width direction D2, if the sheet is deviated in the width direction D2, a level of a deviation amount (lateral deviation amount) thereof, and the like. It is noted that this determination method is well known from the past, so detailed descriptions thereof will be omitted.

[Sheet Correction Unit 60]

As shown in FIG. 3, the sheet correction unit 60 is provided more on the downstream side of the conveying direction D11 than the sheet conveying unit 23 on the conveying path 26. Specifically, the sheet correction unit 60 is provided between the tip end detection sensor 77 and the edge detection sensor 78 on the conveying path 26.

Figure 5:
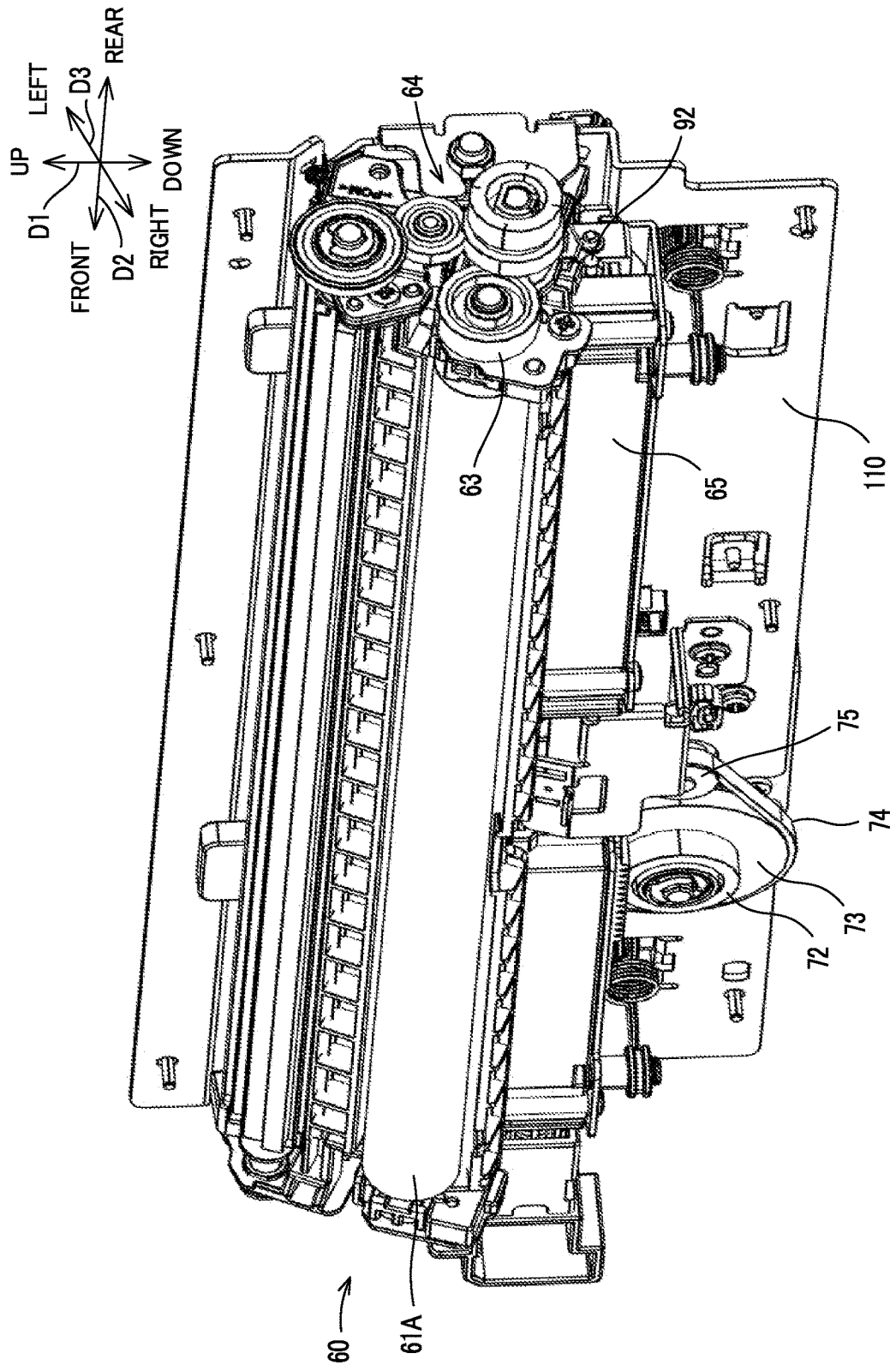
FIG. 5 is a perspective view showing a peripheral configuration of a sheet correction unit of the image forming apparatus.
Figure 6:
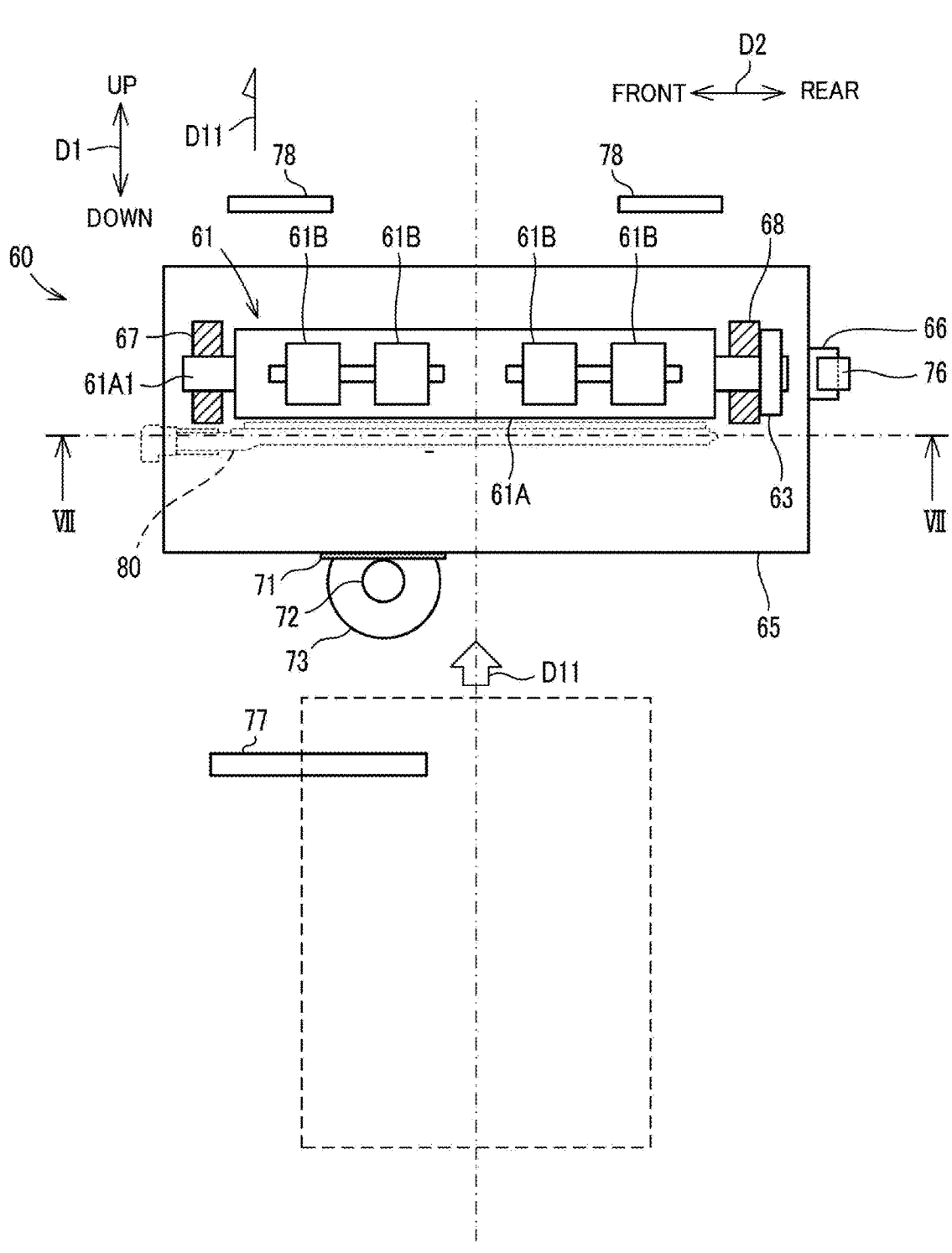
FIG. 6 is a schematic diagram showing a configuration of the sheet correction unit of the image forming apparatus.

FIG. 5 is a perspective view showing a peripheral configuration of the sheet correction unit 60, in which the sheet correction unit 60 is seen from an oblique rearward right direction in FIG. 3. FIG. 6 is a schematic diagram showing a configuration of the sheet correction unit 60, in which the sheet correction unit 60 is seen from the right side in FIG. 3. It is noted that FIG. 5 shows a state where the side cover 112 is removed and a registration roller 61A and the like are exposed.

When the sheet conveyed by the sheet conveying unit 23 is deviated in the width direction D2, the sheet correction unit 60 causes the sheet to return to a predetermined center position to correct that deviation (lateral deviation). Specifically, during a process in which the sheet that has entered the sheet correction unit 60 is nipped and conveyed by the registration roller 61A and driven rollers 61B to be described later, the sheet correction unit 60 causes the sheet to move in the width direction D2 in a direction of correcting the lateral deviation (a direction opposite to the deviation direction) by an amount corresponding to the deviation amount of the sheet in the width direction D2. Thus, the lateral deviation of the sheet in the width direction D2 is corrected.

As shown in FIG. 5, the sheet correction unit 60 is attached to a bracket 110 (an example of a frame supporting portion of the present disclosure) fixed to the housing 11. The sheet correction unit 60 includes a movable frame 65 (an example of a roller supporting frame of the present disclosure), the registration roller 61A (an example of the conveying roller of the present disclosure), the driven rollers 61B, and a paper dust cleaning member 80 (an example of a paper dust cleaning device of the present disclosure; see FIG. 6). It is noted that since the paper dust cleaning member 80 is housed inside the movable frame 65, the paper dust cleaning member 80 is not illustrated in FIG. 5.

The bracket 110 is fixed to the housing 11. The movable frame 65 is attached to the bracket 110. In the present embodiment, the movable frame 65 is formed in a shape that is elongated in the width direction D2. Further, the movable frame 65 is supported by the bracket 110 of the housing 11 so as to be movable in the width direction D2. It is noted that as a supporting mechanism that supports the movable frame 65 such that the movable frame 65 becomes movable in the width direction D2 by the bracket 110, a well-known slide rail mechanism constituted of a rail and a guide or other well-known supporting mechanisms can be applied, for example.

As shown in FIG. 5, a rack 71 is formed at a lower end portion of the movable frame 65.

A driven pulley 73 including a pinion gear 72 is rotatably provided in the bracket 110. The pinion gear 72 intermeshes with the rack 71. Further, a drive pulley 75 is rotatably provided in the bracket 110. The drive pulley 75 is connected to the driven pulley 73 by a belt 74.

A correction motor 52 (an example of a drive portion of the present disclosure; see FIG. 4) for supplying a rotational driving force to the drive pulley 75 is provided in the bracket 110. The drive pulley 75 is attached to an output shaft of the correction motor 52. Therefore, when the correction motor 52 is rotationally driven, the drive pulley 75 rotates upon receiving that rotational driving force, and that rotational driving force is transmitted to the driven pulley 73 via the belt 74.

In the present embodiment, when drive of the correction motor 52 is controlled to perform either a positive rotation or a negative rotation by the control portion 30, the movable frame 65 can slide in either direction (the front direction or the rear direction) in the width direction D2.

As shown in FIG. 6, a protrusion piece 66 that protrudes toward the rear side is provided at a rear end portion of the movable frame 65. Further, an optical sensor 76 capable of detecting the protrusion piece 66 is provided on the rear side of the movable frame 65. The optical sensor 76 is attached to, for example, the housing 11 or the bracket 110. A position of the protrusion piece 66 is detected by the optical sensor 76. As will be described later, by the movable frame 65 moving toward the rear side together with the registration roller 61A, the protrusion piece 66 enters a detection area of the optical sensor 76 to be detected by the optical sensor 76. Thus, the movable frame 65 is arranged at a predetermined initial position. In other words, the position of the movable frame 65 at a time the protrusion piece 66 is detected by the optical sensor 76 is the initial position.

In the present embodiment, when a main power supply of the image forming apparatus 10 is turned on from an off state, the control portion 30 causes the movable frame 65 to move only by a predetermined amount toward one side (front side) of the width direction D2 using the initial position at which the protrusion piece 66 is detected by the optical sensor 76 as a reference, and causes the movable frame 65 and the registration roller 61A to move to a predetermined home position.

The registration roller 61A is a roller member elongated in the width direction D2. The registration roller 61A is rotatably supported by the movable frame 65. The movable frame 65 is provided with a pair of supporting plates 67 and 68 provided apart from each other with a predetermined interval provided therebetween in the width direction D2. The predetermined interval is a length with which the sheet can be conveyed between the pair of supporting plates 67 and 68. Rotation shafts 61A1 are provided at both ends of the registration roller 61A in the axial direction, and the rotation shafts 61A1 are rotatably supported by the supporting plates 67 and 68.

An input gear 63 is attached to the rotation shaft 61A1 on one side (rear side) of the registration roller 61A. A gear transmission mechanism 64 including the input gear 63 is provided on the rear side of the sheet correction unit 60. A conveying motor 53 such as a stepping motor is provided in the bracket 110 or the housing 11. By an input of a rotational driving force of the conveying motor 53 to the gear transmission mechanism 64, the registration roller 61A is rotationally driven, and the sheet is conveyed in the conveying direction D11.

The driven roller 61B is rotatably supported by a conveying guide of the side cover 112. By closing the side cover 112 with respect to the housing 11, the driven roller 61B comes into contact with an outer circumferential surface of the registration roller 61A by a predetermined elastic force of a spring 62 (see FIG. 3).

The registration roller 61A and the driven roller 61B realize a conveying roller pair 61. By this conveying roller pair 61, the sheet is conveyed toward the image transfer position on the downstream side of the conveying direction D11.

[Paper Dust Cleaning Member 80]

Figure 7:
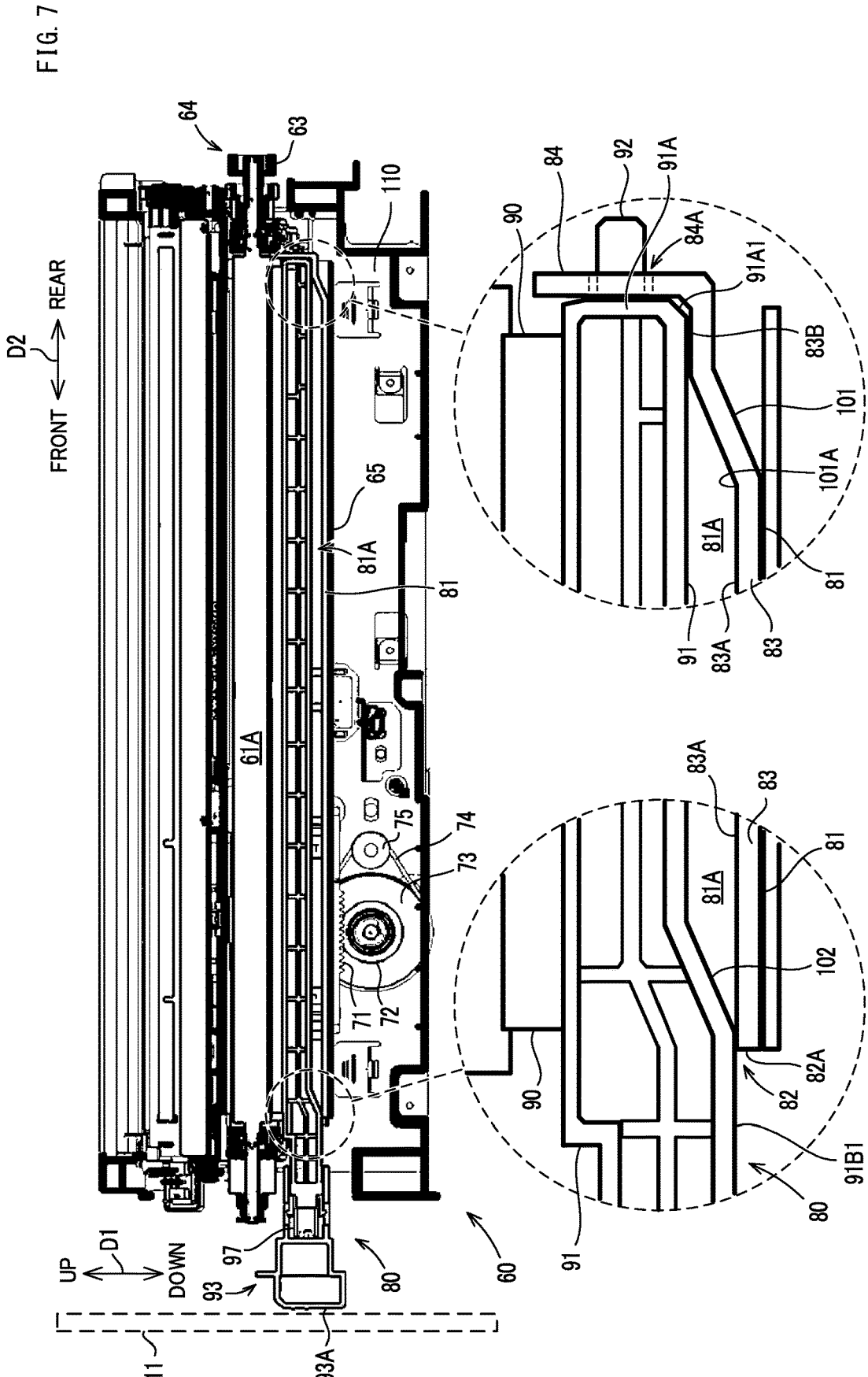
FIG. 7 is a cross-sectional view taken along a line VII-VII in FIG. 6 and shows cross-sectional structures of the sheet correction unit and a paper dust cleaning member of the image forming apparatus.

FIG. 7 is a diagram showing cross-sectional structures of the sheet correction unit 60 and the paper dust cleaning member 80. FIG. 8 to FIG. 11 are diagrams each showing a configuration of the paper dust cleaning member 80. The paper dust cleaning member 80 removes paper dust that has adhered onto the surface of the registration roller 61A that conveys a sheet in the conveying direction D11 and is attached to the movable frame 65 of the sheet correction unit 60 as shown in FIG. 7.

As shown in FIG. 7, a housing portion 81 to which paper dust cleaning member 80 is attached (an example of a holder supporting portion of the present disclosure) is provided integrally with the movable frame 65. The housing portion 81 is configured to support the paper dust cleaning member 80 such that the paper dust cleaning member 80 is movable in the front-rear direction D2. Herein, the front-rear direction D2 is a direction matching with the axial direction or longitudinal direction of the registration roller 61A. In the present embodiment, when the paper dust cleaning member 80 is attached at a given attachment position in the housing portion 81, the housing portion 81 holds the paper dust cleaning member 80 such that a paper dust removing portion 90 of the paper dust cleaning member 80 comes into contact with the surface of the registration roller 61A. It is noted that FIG. 7 shows a state where the paper dust cleaning member 80 is attached at the attachment position and the paper dust removing portion 90 is in contact with the surface of the registration roller 61A.

The housing portion 81 is provided at a lower portion of the movable frame 65, specifically, on a lower side of the registration roller 61A. The housing portion 81 includes an insertion slot 82 formed on a front-side wall surface of the movable frame 65, a supporting plate 83 extending rearwardly from a lower edge portion 82A of the insertion slot 82, and a back wall 84 (an example of an abutting portion of the present disclosure) positioned on a rear side of the housing portion 81. In a portion from the insertion slot 82 to the back wall 84, a space sectioned by the supporting plate 83 and the surface of the registration roller 61A is a housing room 81A for housing the paper dust cleaning member 80 (housing space).

When the paper dust cleaning member 80 is inserted horizontally into the insertion slot 82, a lower portion of the paper dust cleaning member 80 is slidably supported by an upper surface 83A of the supporting plate 83. In other words, the paper dust cleaning member 80 is supported by the supporting plate 83 while being movable in the front-rear direction D2. Then, when the paper dust cleaning member 80 is pushed in toward the rear side, a tip end portion 91A of the paper dust cleaning member 80 is abutted against the back wall 84, and thus the paper dust cleaning member 80 is arranged at the attachment position.

Figure 8:
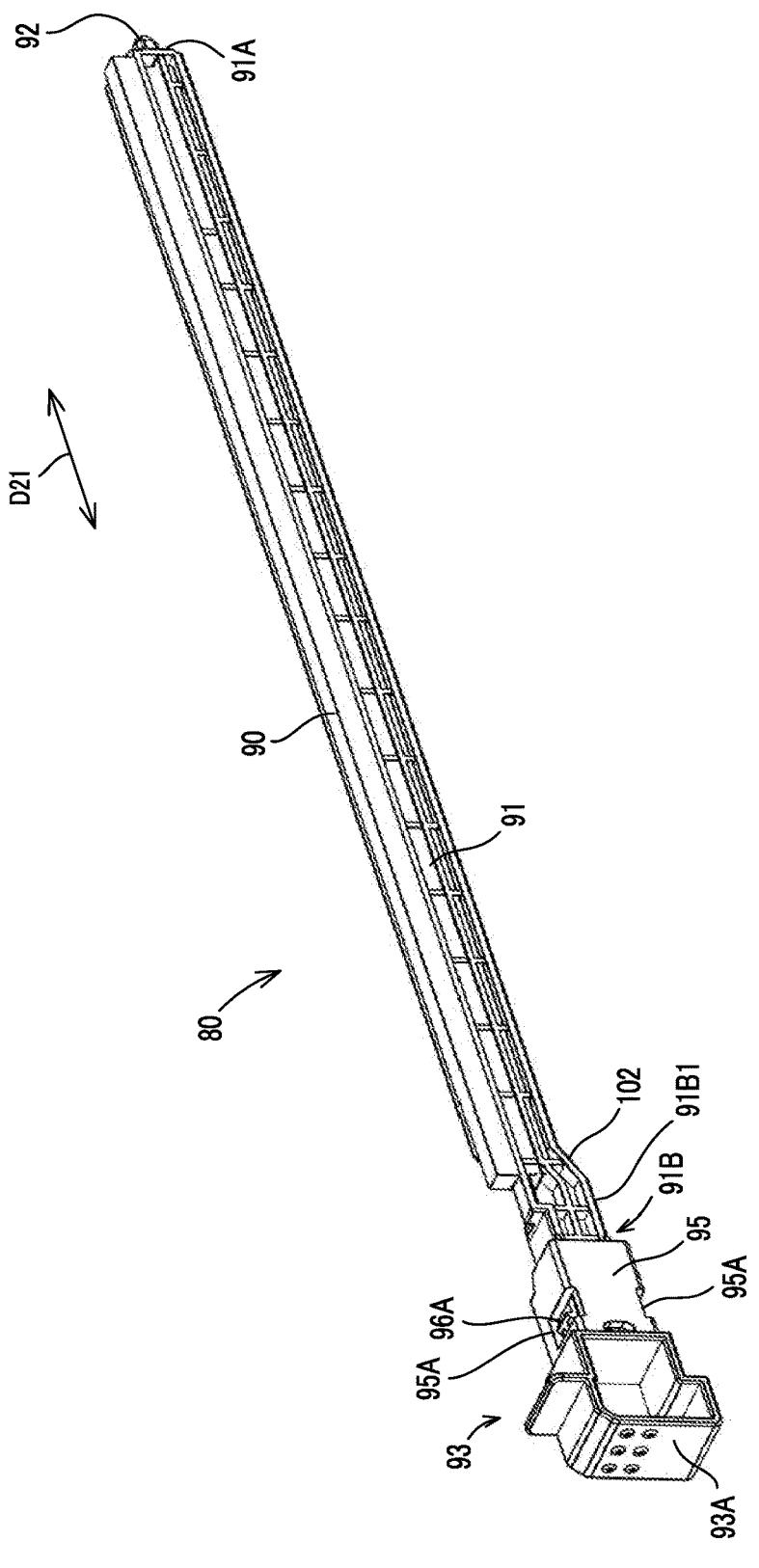
FIG. 8 is a perspective view showing a configuration of the paper dust cleaning member.
Figure 9:
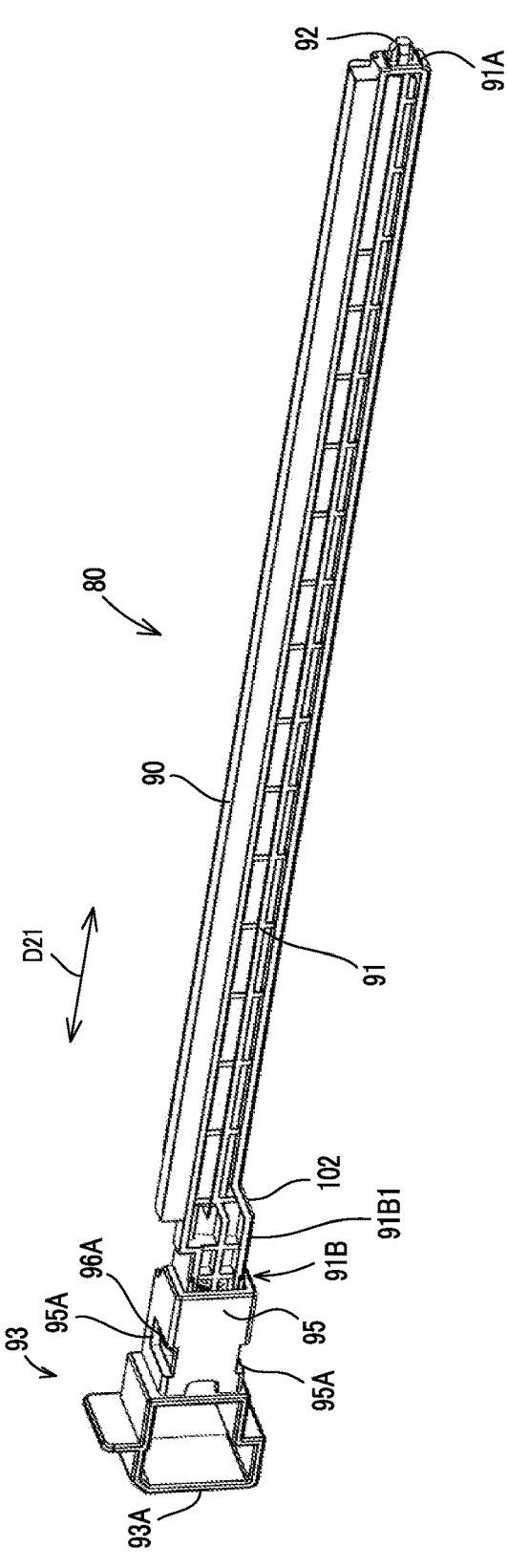
FIG. 9 is a perspective view showing the configuration of the paper dust cleaning member.

As shown in FIG. 8 and FIG. 9, the paper dust cleaning member 80 includes the paper dust removing portion 90 (an example of a paper dust removing member of the present disclosure) and a holder 91 which holds the paper dust removing portion 90. The housing portion 81, the paper dust removing portion 90, and the holder 91 described above realize the paper dust cleaning device of the present disclosure.

Incidentally, a conventional sponge-type or brush-type paper dust removing member used for removing paper dust removes paper dust by being abutted against the conveying roller such as the registration roller 61A that rotates while the image forming apparatus 10 operates. The removed paper dust is recovered in a paper dust tray, but not all of the paper dust is recovered in the paper dust tray and a portion remains on a surface or inside of the conventional paper dust removing member. When replacing the conventional paper dust removing member due to deterioration, if, in a state where the conventional paper dust removing member is abutted against the conveying roller such as the registration roller 61A, the conventional paper dust removing member is drawn out along the axial direction of the conveying roller, there is a fear that the paper dust remaining in the conventional paper dust removing member will adhere onto the conveying roller such as the registration roller 61A to thus cause lowering of quality in subsequent printing.

According to the image forming apparatus 10 of the present embodiment, it is possible to prevent, when replacing the paper dust removing portion 90 (paper dust removing member), the removed paper dust from adhering onto the conveying roller such as the registration roller 61A from the paper dust removing portion 90.

The holder 91 is a long stick-like member formed to be longer than the registration roller 61A in the axial direction. The holder 91 is a resin molded article formed of a synthetic resin, for example. The paper dust cleaning member 80 is attached to the housing portion 81 such that a longitudinal direction D21 of the holder 91 and the axial direction of the registration roller 61A match.

The paper dust removing portion 90 is held on an upper surface of the holder 91. The paper dust removing portion 90 is, for example, a columnar member having a rectangular cross section, and one side surface thereof is bonded to the upper surface of the holder 91. The paper dust removing portion 90 is formed of a soft material, for example, and is formed by, for example, a sponge member, a brush-type member, a brushed member, a non-woven member, a foamed member, or the like. Specific examples of the paper dust removing portion 90 include polyurethane foam, felt, and cork.

A protrusion 92 is formed at the tip end portion 91A of the holder 91. A through-hole 84A (see FIG. 7) into which the protrusion 92 can be inserted is formed on the back wall 84 of the housing portion 81. When the paper dust cleaning member 80 is attached at the attachment position of the housing portion 81, the protrusion 92 is inserted into the through-hole 84A. Thus, the tip end portion 91A of the holder 91 is positioned in a direction orthogonal to the longitudinal direction D21. Further, the tip end portion 91A of the holder 91 is restricted by the back wall 84 so that it does not move further rearwardly. It is noted that a protrusion length of the protrusion 92 is larger than a maximum correction amount (a maximum slide amount of the movable frame 65) by the sheet correction unit 60 in the width direction D2.

Figure 10:
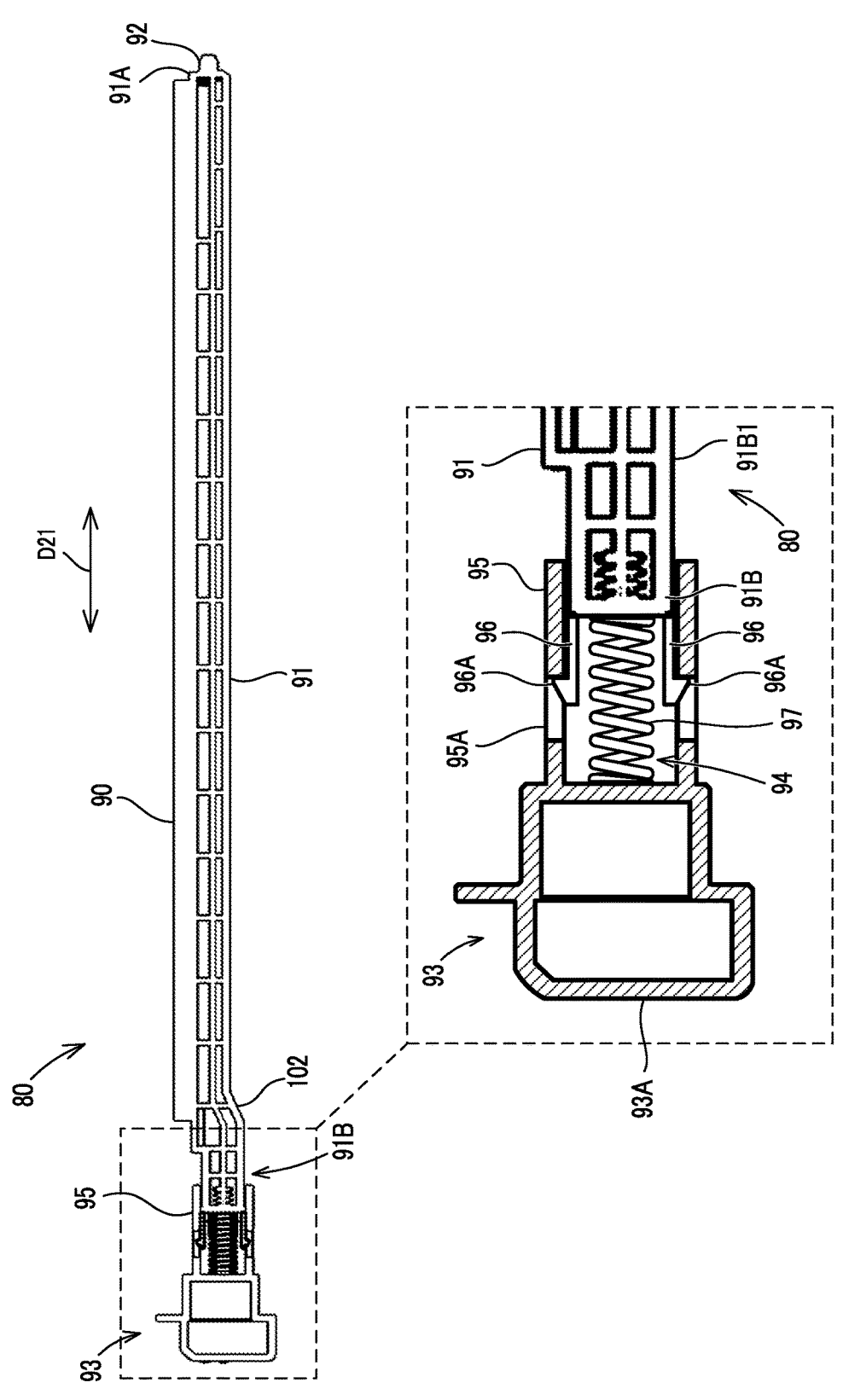
FIG. 10 is a cross-sectional view showing an internal configuration of the paper dust cleaning member.

As shown in FIG. 10, a slide member 93 is attached to a base end portion 91B on one side (front side) of the holder 91 in the longitudinal direction D21. The slide member 93 is attached while being slidable in the longitudinal direction D21 with respect to the base end portion 91B while forming a housing space 94 with an end surface of the base end portion 91B.

The slide member 93 includes a cylindrical portion 95 that has the housing space 94 sectioned therein. The base end portion 91B is inserted into an opening on one side of the cylindrical portion 95. A plurality of slots 95A elongated in the longitudinal direction D21 are formed on an outer circumferential surface of the cylindrical portion 95. The base end portion 91B is provided with a plurality of engagement hooks 96 that protrude from an end surface of the base end portion 91B. In a state where the base end portion 91B is inserted into the cylindrical portion 95, hook portions 96A at tip ends of the engagement hooks 96 are inserted into the slots 95A. The slots 95A are longer than the hook portions 96A in the longitudinal direction D21. Therefore, in a state where the hook portions 96A are engaged with the slots 95A, the slide member 93 can slide within a predetermined range with respect to the base end portion 91B.

A spring 97 (an example of an elastic member of the present disclosure) is attached to the housing space 94. The spring 97 imparts an elastic force that biases the slide member 93 and the holder 91 in directions in which the slide member 93 and the holder 91 are separated from each other. The spring 97 is, for example, a coil spring and is housed in the housing space 94 while being compressed so as to generate the elastic force.

As shown in FIG. 7, the housing portion 81 is provided with a first tilted guide 101 (an example of a first guide portion of the present disclosure). The first tilted guide 101 guides, when the paper dust cleaning member 80 is drawn out forwardly from an attached state where the paper dust cleaning member 80 is attached to the housing portion 81, the paper dust cleaning member 80 to a predetermined separated position (the position shown in FIG. 13) in accordance with that draw-out operation. The separated position is a position at which the paper dust cleaning member 80 is moved away from the surface of the registration roller 61A so that a gap is formed between the surface of the registration roller 61A and the paper dust removing portion 90.

Further, the first tilted guide 101 guides the paper dust cleaning member 80 to a predetermined contact position (the position shown in FIG. 7) from the separated position during the process in which the paper dust cleaning member 80 is attached to the housing portion 81. The contact position is a position at which the paper dust cleaning member 80 approaches the surface of the registration roller 61A from the separated position so that the paper dust removing portion 90 is brought into contact with the surface of the registration roller 61A.

The first tilted guide 101 is integrally formed with the supporting plate 83. The first tilted guide 101 is provided at a rear end portion of the supporting plate 83. The first tilted guide 101 is a tilted surface that tilts in an oblique upward rear direction from the upper surface 83A of the supporting plate 83. The tilt angle of the first tilted guide 101 can be set at an arbitrary angle and can be set within a range of, for example, 0 degree to 45 degrees.

In the supporting plate 83, a flat supporting portion 83B is formed more on the rear side than the first tilted guide 101. In the state where the paper dust cleaning member 80 is attached to the housing portion 81, a lower end portion 91A1 of the tip end portion 91A is supported by the flat supporting portion 83B.

Further, as shown in FIG. 7, the holder 91 is provided with a second tilted guide 102 (an example of a second guide portion of the present disclosure). The second tilted guide 102 guides, when the paper dust cleaning member 80 is drawn out forwardly from the attached state where the paper dust cleaning member 80 is attached to the housing portion 81, the paper dust cleaning member 80 to the separated position in accordance with that draw-out operation.

Further, the second tilted guide 102 guides the paper dust cleaning member 80 to the contact position from the separated position during the process in which the paper dust cleaning member 80 is attached to the housing portion 81.

The second tilted guide 102 is integrally formed with the holder 91. The second tilted guide 102 is provided on the base end portion 91B side of the holder 91. The second tilted guide 102 is a tilted surface that tilts in an oblique upward rear direction from a lower surface 91B1 of the base end portion 91B. The tilt angle of the second tilted guide 102 can be set to be the same as the tilt angle of the first tilted guide 101.

Figure 12:
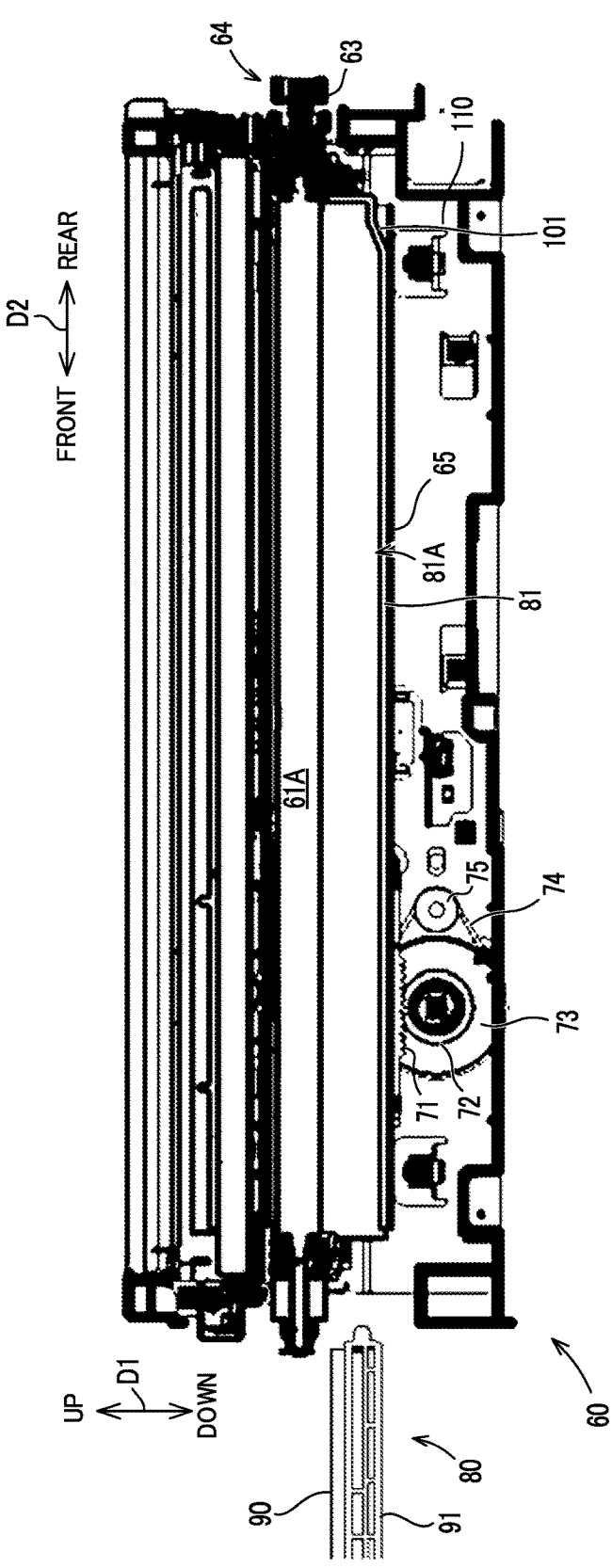
FIG. 12 is a diagram showing the sheet correction unit and the paper dust cleaning member, the diagram showing a state before the paper dust cleaning member is inserted into the sheet correction unit.

The task of attaching the paper dust cleaning member 80 to the housing portion 81 is carried out in a state where the power supply of the image forming apparatus 10 is turned off. When the front cover 111 (see FIG. 1) of the image forming apparatus 10 is opened, the insertion slot 82 is exposed (see FIG. 12).

Figure 13:
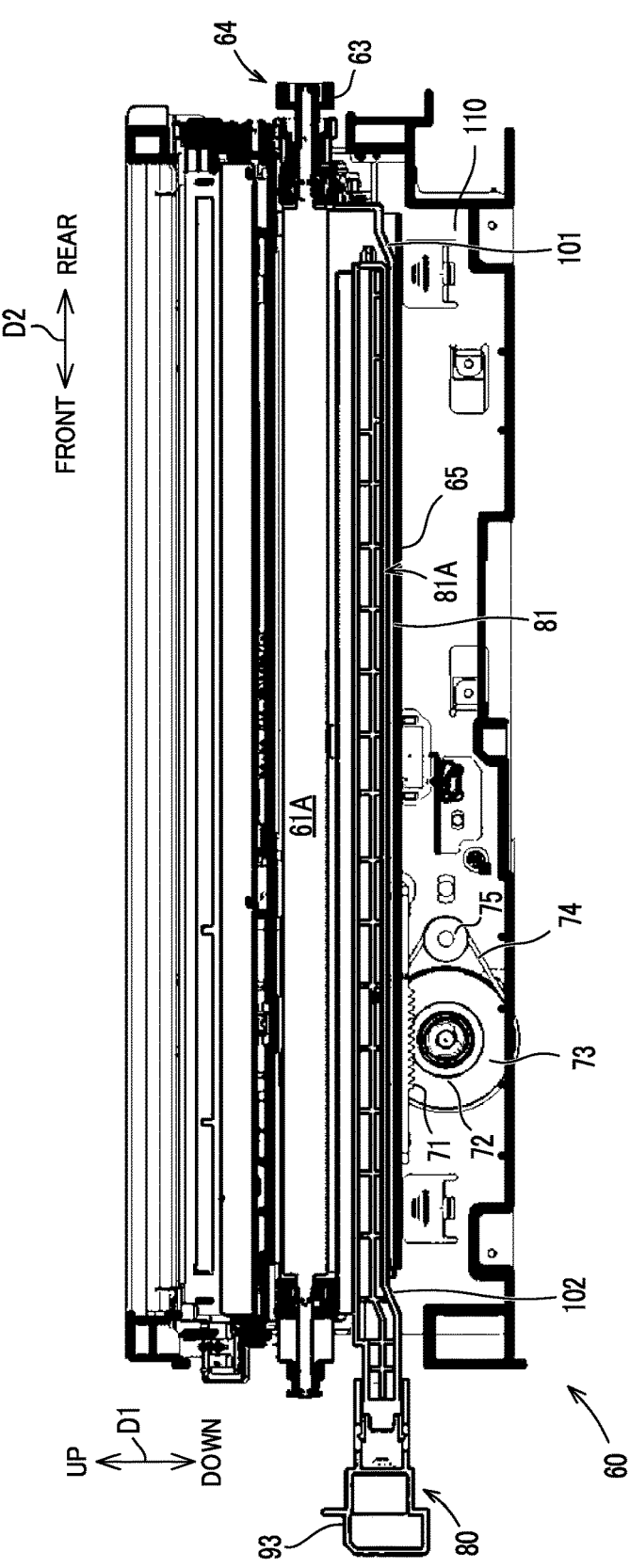
FIG. 13 is a diagram showing the sheet correction unit and the paper dust cleaning member, the diagram showing a state where the paper dust cleaning member is inserted to a back portion of the sheet correction unit.

When the paper dust cleaning member 80 is inserted horizontally into the insertion slot 82 and pushed into the back side, the tip end portion 91A reaches the vicinity of the back wall 84 (see FIG. 13). At this time, the lower end portion 91A1 of the tip end portion 91A of the holder 91 is arranged on a lower end portion 101A of the first tilted guide 101. In this state, the second tilted guide 102 of the holder 91 is not yet abutted against the lower edge portion 82A of the insertion slot 82.

Figure 14:
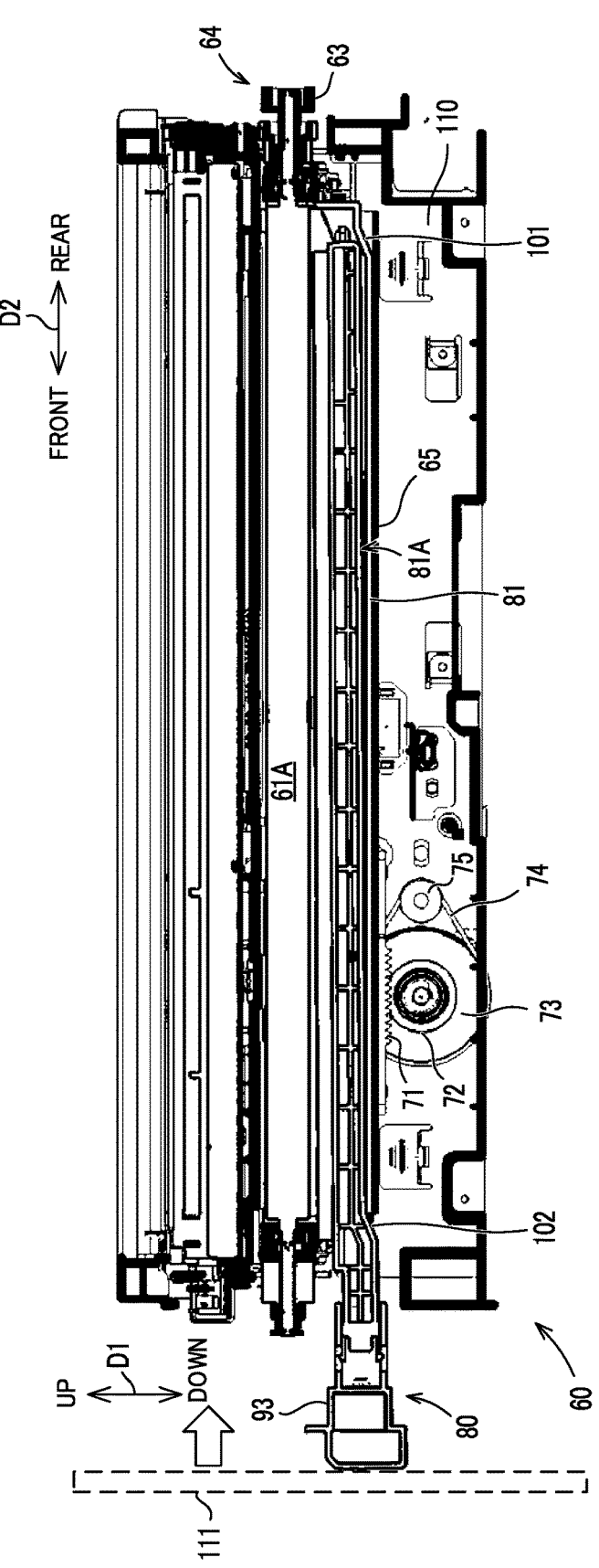
FIG. 14 is a diagram showing the sheet correction unit and the paper dust cleaning member, the diagram showing a state where the paper dust cleaning member is pressed to a specified attachment position after being inserted.

After that, when the front cover 111 of the image forming apparatus 10 is closed, during that blocking process, the back surface of the front cover 111 is abutted against a front end portion 93A (see FIG. 7) of the slide member 93 to thus push the slide member 93 toward the back side (rear side). Thus, the paper dust cleaning member 80 enters the back side. Along with the entering of the paper dust cleaning member 80, the lower end portion 91A1 of the tip end portion 91A of the holder 91 slides on the tilted surface of the first tilted guide 101, and the tip end portion 91A slides up and proceeds on the first tilted guide 101 (see FIG. 14). Thus, the tip end portion 91A is pushed up toward the registration roller 61A side. Then, the lower end portion 91A1 reaches the flat supporting portion 83B, and the paper dust cleaning member 80 further moves toward the back side, with the result that the protrusion 92 is inserted into the through-hole 84A on the back wall 84, and the tip end portion 91A is abutted against the back wall 84.

During the process in which the lower end portion 91A1 of the tip end portion 91A slides up and proceeds on the first tilted guide 101, the second tilted guide 102 of the holder 91 is abutted against the lower edge portion 82A of the insertion slot 82. Thus, the base end portion 91B of the holder 91 is pushed up toward the registration roller 61A side following the tip end portion 91A. Then, before the protrusion 92 is inserted into the through-hole 84A on the back wall 84 and the tip end portion 91A is abutted against the back wall 84, the lower surface 91B1 of the base end portion 91B slides up onto the upper surface 83A of the supporting plate 83 beyond the lower edge portion 82A. At this time, as shown in FIG. 7, the entire paper dust removing portion 90 is in contact with the surface of the registration roller 61A at a uniform pressure. Then, as the back surface of the front cover 111 further pushes the paper dust cleaning member 80 so as to move it toward the back side, the registration roller 61A and the movable frame 65 move toward the initial position on the back side due to contact friction between the paper dust removing portion 90 and the registration roller 61A.

Figure 11:
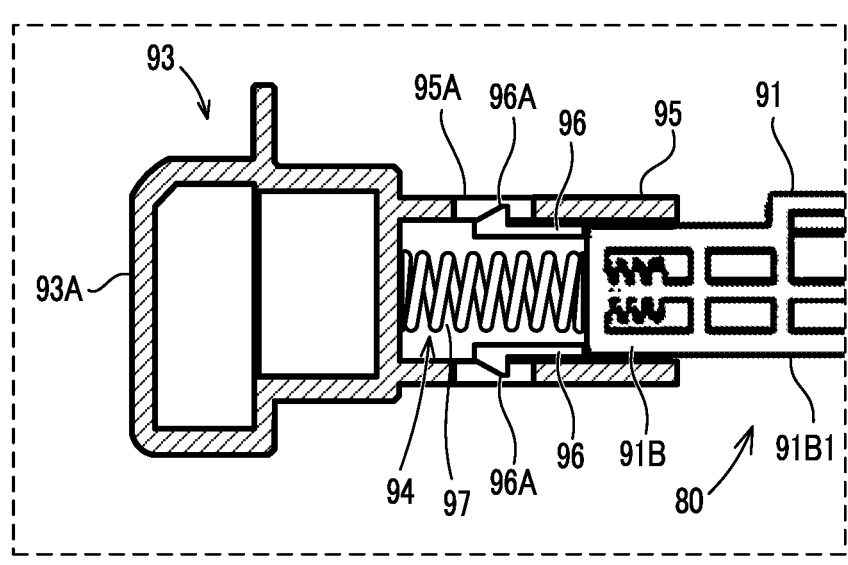
FIG. 11 is an enlarged cross-sectional view of a slide member of the paper dust cleaning member.

As the paper dust cleaning member 80 enters the back side and the tip end portion 91A is abutted against the back wall 84 during the blocking process of closing the front cover 111, the holder 91 is stopped from moving any further. Moreover, the registration roller 61A and the movable frame 65 that have moved to the back side by the contact friction also stop, and the registration roller 61A and the movable frame 65 are arranged at the initial position. By further closing the front cover 111 and latching it to the housing 11 in that state, the attachment of the paper dust cleaning member 80 to the housing portion 81 is completed. By pushing the slide member 93 by the front cover 111 until the front cover 111 is latched to the housing 11, the slide member 93 moves in a direction in which it approaches the base end portion 91B against the elastic force of the spring 97. At this time, as shown in FIG. 11, a state where the hook portions 96A are inserted into the slots 95A but are not engaged with edge portions of the slots 95A is retained.

In the attached state where the paper dust cleaning member 80 is attached to the housing portion 81, the elastic force with which the spring 97 biases the holder 91 is smaller than the contact friction force between the paper dust removing portion 90 and the registration roller 61A. In other words, in the present embodiment, the spring 97 set to have an elastic force smaller than the contact friction force between the paper dust removing portion 90 and the registration roller 61A in the attached state is applied.

It is noted that at least the front cover 111, the spring 97, the movable frame 65, and the flat supporting portion 83B constitute a positioning mechanism of the present disclosure.

The task of removing the paper dust cleaning member 80 from the housing portion 81 is carried out in the state where the power supply of the image forming apparatus 10 is turned off.

When the front cover 111 (see FIG. 1) of the image forming apparatus 10 is opened, the pressing by the front cover 111 is released. At this time, the paper dust cleaning member 80 moves from the contact position shown in FIG. 7 to the position shown in FIG. 14 by an impulse with which the slide member 93 slides forwardly by the elastic force of the spring 97. Then, when the paper dust cleaning member 80 is drawn out a bit, the paper dust cleaning member 80 is guided to the separated position shown in FIG. 13. At this time, the paper dust removing portion 90 of the paper dust cleaning member 80 and the surface of the registration roller 61A are set apart from each other by a predetermined gap. By drawing out the paper dust cleaning member 80 in this state, the paper dust cleaning member 80 can be drawn out of the housing portion 81 without causing the paper dust removing portion 90 to come into slide contact with the surface of the registration roller 61A.

[Control Portion 30]

The control portion 30 collectively controls the image forming apparatus 10, controls operations of the sheet conveying unit 23 and operations of the sheet correction unit 60, and controls a conveying speed by the respective conveying roller pairs. As shown in FIG. 4, the control portion 30 is constituted of a CPU 31, a ROM 32, a RAM 33, a flash memory 34, a motor driver 35, and the like. The control portion 30 is an example of a movement control portion of the present disclosure. The control portion 30 is electrically connected to the respective motors 51, 52, and 53 and the respective sensors 76, 77, and 78 by signal lines and the like. It is noted that the respective motors 51, 52, and 53 are connected to the motor driver 35 of the control portion 30, and drive thereof is controlled based on individual control signals from the motor driver 35.

In the present embodiment, with respect to a skewed sheet being conveyed, the control portion 30 operates the sheet correction unit 60 to correct the skew of the sheet.

[Sheet Correction Processing]

Figure 15:
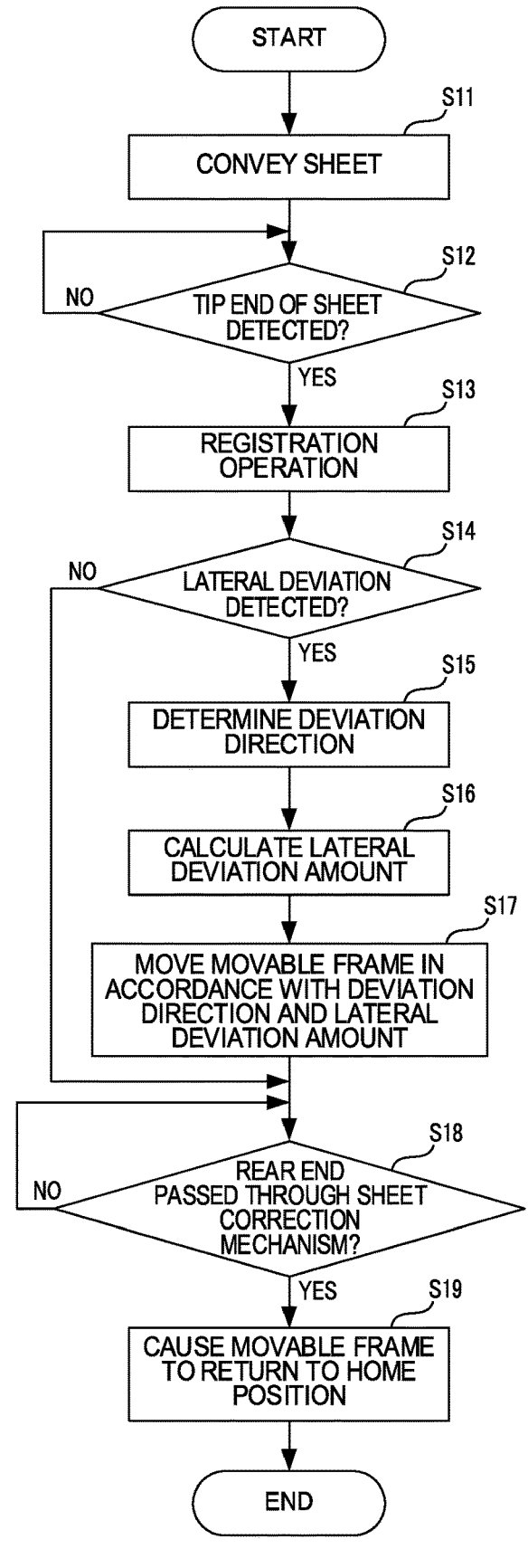
FIG. 15 is a flowchart showing exemplary procedures of sheet correction processing executed by a control portion of the image forming apparatus.

Hereinafter, using the flowchart shown in FIG. 15, exemplary procedures of sheet correction processing executed by the control portion 30 will be described.

It is noted that in the image forming apparatus 10, it is assumed that the movable frame 65 of the sheet correction unit 60 is arranged at the home position before the sheet correction processing is carried out.

As an instruction signal to start an image forming operation is input to the image forming apparatus 10, the image forming processing by the image forming apparatus 10 is started. First, the control portion 30 starts conveyance of a sheet (S11). Specifically, the motor driver 35 of the control portion 30 drives the conveying motors 51 and 53, other motors (not shown), and the like to cause the drive roller 22A of the sheet feed roller pair 22, the pickup roller 29, the drive roller 23A of the sheet conveying unit 23, the discharge roller pair, and the like to rotate. Thus, the sheet is taken out from the sheet storing portion 27 to be fed to the conveying path 26, and the sheet is conveyed in the conveying direction D11 by the sheet feed roller pair 22 and the sheet conveying unit 23.

In the next Step S12, the control portion 30 determines whether or not a tip end of the sheet has been detected based on the detection signal output from the tip end detection sensor 77. In other words, the control portion 30 determines whether or not the tip end of the sheet has passed through the detection position of the tip end detection sensor 77.

When determining that the tip end of the sheet has been detected in Step S12, the control portion 30 carries out a registration operation for correcting a skew of the sheet (S13). Specifically, the control portion 30 temporarily stops the registration roller 61A before the sheet enters the registration roller 61A. Thus, the tip end of the sheet is abutted against the nip portion between the registration roller 61A and the driven rollers 61B, and the skew of the sheet is corrected. It is noted that the registration roller 61A is driven again after the registration operation, and the sheet is conveyed again.

When the tip end of the sheet reaches the edge detection sensor 78, in the next Step S14, the control portion 30 determines whether or not the sheet is deviated in either one of the sides (the front side or the rear side) in the width direction D2 based on the detection signal from the edge detection sensor 78. Herein, when there is a deviation in the width direction D2 (lateral deviation), the processing advances to Step S15 to obtain a deviation direction and a lateral deviation amount. On the other hand, when there is no lateral deviation, the processing advances to Step S18.

In Step S16, the control portion 30 calculates a direction of the lateral deviation of the sheet (deviation direction) and the lateral deviation amount. After that, in Step S17, the control portion 30 causes the movable frame 65 of the sheet correction unit 60 to perform a slide movement in a deviation correction direction according to the lateral deviation amount. Specifically, the control portion 30 controls drive of the correction motor 52 to cause the movable frame 65 to move from the home position in a direction opposite to the lateral deviation direction of the sheet only by the lateral deviation amount. Thus, the lateral deviation of the sheet is corrected. After carrying out the slide movement in Step S17, the processing advances to Step S18.

In Step S18, the control portion 30 determines whether or not a rear end of the sheet has passed through the sheet correction unit 60. Then, when determining that the rear end of the sheet has passed through the sheet correction unit 60, the control portion 30 causes the movable frame 65 to return to the home position (S19). Upon ending the image forming processing on the sheet, the control portion 30 stops the drive of the respective motors 51, 52, and 53 and ends the series of processing.

As described heretofore, the image forming apparatus 10 of the present embodiment is provided with the paper dust cleaning member 80 including the paper dust removing portion 90 and the housing portion 81 which slidably supports the holder 91 of this paper dust cleaning member 80. Therefore, even when the movable frame 65 is slid for correcting the lateral deviation and the registration roller 61A is also moved in the same direction, the holder 91 and the paper dust removing portion 90 slide in the same direction following that slide of the registration roller 61A. Thus, deterioration and damage of the paper dust removing portion 90 due to the slide of the registration roller 61A in the axial direction are reduced, and shortening of a lifetime of the paper dust removing portion 90 is prevented from occurring. In addition, since the paper dust removing portion 90 is not deformed along with the slide of the registration roller 61A in the axial direction, scattering of removed paper dust in the paper dust removing portion 90 is prevented from occurring.

Further, when the paper dust cleaning member 80 is inserted into the housing room 81A of the housing portion 81 from the insertion slot 82 and the paper dust cleaning member 80 is attached at the attachment position at the back portion of the housing portion 81 while the power supply of the image forming apparatus 10 is off, the paper dust removing portion 90 and the surface of the registration roller 61A come into contact with each other during the attachment process. At this time, the force in the insertion direction of the paper dust cleaning member 80 acts as a force that moves the registration roller 61A and the movable frame 65 toward the rear side by the contact friction. Thus, by the contact friction, the registration roller 61A and the movable frame 65 move toward the rear side. As a result, when attaching the paper dust cleaning member 80, the movable frame 65 can be arranged at the initial position.

Furthermore, since the housing portion 81 is provided with the first tilted guide 101 and the holder 91 is provided with the second tilted guide 102, the paper dust removing portion 90 of the paper dust cleaning member 80 and the surface of the registration roller 61A can be set apart from each other by merely opening the front cover 111 and drawing out the paper dust cleaning member 80 a bit. In this case, opposite to the time of attaching the paper dust cleaning member 80, the base end portion 91B of the holder 91 is set apart from the surface of the registration roller 61A by the second tilted guide 102 earlier than the tip end portion 91A, and the tip end portion 91A then follows to be set apart from the surface of the registration roller 61A by the first tilted guide 101. After that, the paper dust cleaning member 80 is guided to the separated position. Thus, since the paper dust removing portion 90 is not brought into slide contact with the surface of the registration roller 61A during the process of drawing out the paper dust cleaning member 80, a situation where the removed paper dust in the paper dust removing portion 90 adheres again onto the surface of the registration roller 61A is prevented from occurring.

It is noted that the embodiment above has exemplified the configuration in which, when attaching the paper dust cleaning member 80, the tip end portion 91A is first pushed up toward the registration roller 61A side by the first tilted guide 101 earlier than the base end portion 91B, and the base end portion 91B is then pushed up toward the registration roller 61A side by the second tilted guide 102 following the tip end portion 91A, and when drawing out the paper dust cleaning member 80, the base end portion 91B first moves away from the surface of the registration roller 61A by the second tilted guide 102 earlier than the tip end portion 91A, and the tip end portion 91A then moves away from the surface of the registration roller 61A by the first tilted guide 101 following the base end portion 91B. However, the present disclosure is not limited to this configuration. For example, as the supporting mechanism of the paper dust cleaning member 80, a configuration may be applied in which the tilt angles of the tilted surfaces of the first tilted guide 101 and the second tilted guide 102 are the same, and when drawing out the paper dust cleaning member 80, the paper dust cleaning member 80 performs a parallel movement to the separated position in accordance with the movement of the paper dust cleaning member 80 from the attachment position toward the insertion slot 82 side.

Moreover, the embodiment above has exemplified the configuration in which the state where the slide member 93 is pressed is retained by closing the front cover 111 as an example of the lock member with respect to the housing 11. However, the present disclosure is not limited to this configuration. Different from the front cover 111, a cover member that blocks and locks the insertion slot 82 may be provided in the movable frame 65. Alternatively, a lock mechanism that locks the slide member 93 in a state where the paper dust cleaning member 80 is attached to the housing portion 81, for example, may be provided in place of the cover member.

Further, although the embodiment above has exemplified the paper dust cleaning member 80 for removing paper dust of the registration roller 61A, the paper dust cleaning member 80 may alternatively be applied as a member that removes paper dust from conveying rollers other than the registration roller 61A, such as the drive roller 22A and the drive roller 23A, for example. For example, when there is a margin in the axial direction of the rotation shafts of the drive rollers 22A and 23A, the drive rollers 22A and 23A may move in the axial direction due to oscillations caused during the operation of the image forming apparatus 10, or the like. Even in this case, the holder 91 and the paper dust removing portion 90 can be moved in the same direction following the movements of the drive rollers 22A and 23A in the axial direction.

Furthermore, although the embodiment above has exemplified the image forming apparatus 10 as the embodiment of the present disclosure, the present disclosure can also be captured as a paper dust cleaning device constituted of the housing portion 81, the paper dust removing portion 90, and the holder 91.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:
a paper dust cleaning device which removes paper dust that has adhered onto a surface of a conveying roller that conveys a paper sheet in a predetermined conveying direction, wherein
the paper dust cleaning device includes
  a paper dust removing member which extends in an axial direction of the conveying roller and comes into contact with the surface of the conveying roller,
  a holder which is formed in a shape that is elongated in the axial direction and holds the paper dust removing member, and
  a holder supporting portion which supports the holder such that the holder is movable in the axial direction and holds the holder inserted from a predetermined insertion slot along the axial direction at a predetermined attachment position so that the paper dust removing member comes into contact with the surface of the conveying roller, and
the holder supporting portion includes
  a first guide portion which is provided on a side of the attachment position and guides the holder to a separated position at which the holder is set apart from the surface of the conveying roller in accordance with a movement of the holder from the attachment position toward a side of the insertion slot.

2. The image forming apparatus according to claim 1, wherein
the holder includes
  a second guide portion which is provided on the side of the insertion slot and guides the holder to the separated position in accordance with the movement of the holder from the attachment position toward the side of the insertion slot.

3. The image forming apparatus according to claim 2, wherein
the first guide portion and the second guide portion are tilted surfaces which guide the holder from the attachment position to the separated position.

4. The image forming apparatus according to claim 3, wherein
tilt angles of the tilted surfaces of the first guide portion and the second guide portion are substantially the same, and the holder is caused to move in a parallel movement to the separated position in accordance with the movement of the holder from the attachment position toward the side of the insertion slot.

5. The image forming apparatus according to claim 1, further comprising:
an elastic member which imparts an elastic force in the axial direction to the holder inserted from the insertion slot; and
a lock member which presses the holder toward the side of the attachment position against the elastic force of the elastic member in a state where the holder is inserted to cause the holder to move to the attachment position, and also holds the holder at the attachment position.

6. The image forming apparatus according to claim 5, wherein
the lock member is a cover member which blocks the insertion slot, and
when the insertion slot is blocked by the cover member, a back surface of the cover member is abutted against the holder to press the holder toward the side of the attachment position.

7. The image forming apparatus according to claim 6, wherein
the insertion slot is arranged on a predetermined side surface side of the image forming apparatus, and the cover member blocks the insertion slot and also blocks the side surface side of the image forming apparatus.

8. The image forming apparatus according to claim 6, wherein
the holder includes a slide member which is attached to a base end portion on one side of the holder in a longitudinal direction and is capable of sliding in the longitudinal direction while forming a space between the slide member and the base end portion,
the elastic member is provided between the slide member and the base end portion so as to generate the elastic force, and
when the insertion slot is blocked by the cover member, the back surface of the cover member presses the slide member toward the side of the attachment position.

9. A paper dust cleaning device which removes paper dust that has adhered onto a surface of a conveying roller that conveys a paper sheet in a predetermined conveying direction, the paper dust cleaning device comprising:
a paper dust removing member which extends in an axial direction of the conveying roller and comes into contact with the surface of the conveying roller;
a holder which is formed in a shape that is elongated in the axial direction and holds the paper dust removing member; and a holder supporting portion which supports the holder such that the holder is movable in the axial direction and holds the holder inserted from a predetermined insertion slot along the axial direction at a predetermined attachment position so that the paper dust removing member comes into contact with the surface of the conveying roller, wherein the holder supporting portion includes a first guide portion which is provided on a side of the attachment position and guides the holder to a separated position at which the holder is set apart from the surface of the conveying roller in accordance with a movement of the holder from the attachment position toward a side of the insertion slot.

\* \* \* \* \*